United States Patent [19]

Bartsch

[11] Patent Number: 5,413,626
[45] Date of Patent: May 9, 1995

[54] PROCESS FOR THE WET CLEANING OF GASES

[75] Inventor: Arno Bartsch, Marxen, Germany

[73] Assignee: Norddeutsche Affinerie Aktiengesellschaft, Hamburg, Germany

[21] Appl. No.: 139,184

[22] Filed: Oct. 19, 1993

[30] Foreign Application Priority Data

Dec. 23, 1992 [DE] Germany .............. 42 43 759.8

[51] Int. Cl.$^6$ .............................................. B01D 51/00
[52] U.S. Cl. ............................ 95/219; 55/238; 55/257.4; 95/224
[58] Field of Search .............. 55/237, 238, 257.4; 95/219, 224, 271

[56] References Cited

U.S. PATENT DOCUMENTS

| | | | |
|---|---|---|---|
| 2,604,185 | 7/1952 | Johnstone et al. | 95/219 |
| 3,186,146 | 6/1965 | Latham, Jr. | 55/257.4 |
| 3,353,335 | 11/1967 | Caballero | 95/224 |
| 3,488,924 | 1/1970 | Reeve | 95/219 |
| 3,490,204 | 1/1970 | Kalika | 95/224 |
| 3,624,985 | 12/1971 | Giles | 95/219 |
| 3,703,800 | 11/1972 | Courbon | 55/257.4 |
| 3,852,409 | 12/1974 | Martin et al. | 55/238 |
| 3,853,505 | 12/1974 | Tretter, Jr. et al. | 55/238 |
| 3,912,469 | 10/1975 | Ewan et al. | 55/238 |
| 4,120,670 | 10/1978 | Pircon | 95/219 |
| 4,141,701 | 2/1979 | Ewan et al. | 95/219 |
| 4,272,499 | 6/1981 | Cason et al. | 95/219 |
| 4,286,973 | 9/1981 | Hamlin et al. | 95/219 |

FOREIGN PATENT DOCUMENTS

| | | | |
|---|---|---|---|
| 547351 | 10/1956 | Belgium | 55/238 |
| 903942 | 10/1945 | France | 55/238 |
| 960452 | 3/1957 | Germany . | |
| 1300093 | 7/1969 | Germany . | |
| 4243759 | 1/1994 | Germany . | |
| 61-271015 | 12/1986 | Japan | 55/238 |
| 59081 | 7/1968 | Luxembourg . | |
| 782844 | 11/1980 | U.S.S.R. | 55/238 |
| WO88/03050 | 5/1988 | WIPO . | |

*Primary Examiner*—Charles S. Bushey
*Attorney, Agent, or Firm*—Herbert Dubno

[57] ABSTRACT

For their wet purification, gases flowing in a line are sprayed with scrubbing liquor, the resulting mixture of gas and liquid is passed through a cyclone separator. The gas is initially sprayed in a pre-scrubbing line and the gas which contains scrubbing liquor is subsequently conducted through a substantially horizontal accelerating line having at its entrance a cross-sectional area which is 1.5 to 8 times larger than the cross-sectional area at its exit. The exit of the accelerating line communicates with the cyclone separator. Purified gas is withdrawn from the cyclone separator.

5 Claims, 1 Drawing Sheet

PROCESS FOR THE WET CLEANING OF GASES

SPECIFICATION

Field of the Invention

My present invention relates to a process and apparatus for the wet cleaning of a gas and, more particularly, to a cleaning process involving the scrubbing of the gas with a liquid, followed by gas/liquid separation.

BACKGROUND OF THE INVENTION

It is common in the cleaning of a gas e.g. before it is released into the atmosphere or used to recover valuable constituents or to participate in chemical reactions, and especially flue gases of various combustion processes, metallurgical waste gases and gases produced by other industrial processes which may contain soluble noxious and/or toxic substances (including sulfur and nitrogen compounds) as well as dust and particulates, to subject the gas to a wet cleaning in which it is sprayed with scrubbing liquor as the gas flows in a line. Thereafter the resulting gas-liquid mixture is passed through a cyclone separator and purified gas and contaminated scrubbing liquor are separately withdrawn from said separator. During their wet purification, the gases may be cooled and/or chemically treated.

Processes and apparatuses of this kind are known from German Patent 960,452, German Patent Publication 1,300,093, and International Application WO 88/03050.

In these cases the lines which are traversed by the gas to be purified as it flows into the cyclone separator are provided with means for spraying scrubbing liquor. However in these systems there is no optimum contact between the gas and liquid.

OBJECT OF THE INVENTION

It is an object of the invention to provide an improved process whereby the drawbacks of these earlier systems are obviated and the gas can be cleaned at low cost.

Another object of the invention is to provide a gas cleaning process which avoids a soiling of the purifying apparatus and which enables scrubbing liquor (i.e. depleted scrubbing liquor) to be discharged from the apparatus on the shortest possible path.

It is yet another object to provide an improved apparatus for carrying out the new process.

SUMMARY OF THE INVENTION

In the process of the invention, these are achieved in that the gas containing impurities is sprayed with scrubbing liquid in a pre-scrubbing line, the gas which comes from the pre-scrubbing line and contains scrubbing liquor is passed through a substantially horizontal accelerating line, which at its entrance has a cross-sectional area that is 1.5 to 8 times larger and preferably 2 to 6 times larger than its cross-sectional area at its exit, additional scrubbing liquor is sprayed into the gas in the accelerating line, and the gas-liquid mixture is passed from the accelerating line into the cyclone separator.

To improve the scrubbing performance and to effect a high degree of separation of the scrubbing liquor in the cyclone separator, the gas is advantageously sprayed in the accelerating line with larger liquid droplets than in the pre-scrubbing line. As a result, the smaller droplets from the pre-scrubbing line combine in the accelerating line with the larger liquid droplets in the accelerating line.

According to a feature of the invention, the scrubbing liquor is sprayed at a low velocity from the spraying means into the gas in the accelerating line.

Each of the pre-scrubbing and accelerating lines are provided with at least one sprayer. Each line may readily be provided with more than one sprayer. In most cases it will be sufficient to provide each of the pre-scrubbing and accelerating lines with two sprayers. The scrubbing liquor is preferably sprayed in the accelerating line at a lower rate than in the pre-scrubbing line. To form fine droplets, the sprayers may be supplied with liquid and atomizing air.

The substantially horizontally-extending accelerating line, which is traversed at high turbulence, must be sufficiently long for the required contact between the gas and liquid droplets. For this reason it is preferred that its length be 4 to 20 times and, most preferably, 6 to 15 times the diameter of the entrance cross-section of the accelerating duct.

Owing to the direct contact between the gas and liquid in the cyclone scrubber, the temperature of the treated gas is approximately as high as the temperature of the liquid which flows out of the cyclone. If the scrubbing liquor is recooled in a heat exchanger it will then be possible to cool the gas much more effectively than would be possible, e.g. by an indirect cooling. For this purpose the scrubbing liquor being circulated is recooled in a suitable heat exchanger, e.g. by means of cooling water, before it is sprayed again. The process according to the invention thus comprises the steps of:

(a) initially passing the gas through a substantially constant cross section prescrubbing line and spraying the gas with a scrubbing liquid at at least one location along the prescrubbing line;

(b) then passing the gas from the prescrubbing line through a substantially horizontal accelerating line having an entrance flow cross section substantially 1.5 to 8 times larger than an exit flow cross section;

(c) spraying the gas with additional scrubbing liquid in the accelerating line at at least one location therealong;

(d) discharging the horizontal accelerating line at the exit flow cross section into a cyclone separator and separating contaminated scrubbing liquid from cleaned gas in the cyclone separator; and (e) separately withdrawing the contaminated scrubbing liquid and cleaned gas from the cyclone separator.

The apparatus can generally be considered to comprise:
a substantially horizontal prescrubbing line traversed by a gas to be cleaned and of a substantially constant cross section;
at least one spraying station along the prescrubbing line for spraying gas traversing same with a scrubbing liquid;
a substantially horizontal accelerating line connected directly to and directly following the prescrubbing line and traversed by the gas, the accelerating line having an entrance flow cross section substantially 1.5 to 8 times the cross sectional area of an exit flow cross section and tapering between the entrance flow cross section and the exit flow cross section;
at least one spraying station along the accelerating line for spraying gas traversing same with a scrubbing liquid;

a separating cyclone connected to the accelerating line at the exit flow cross section and separating a contaminated scrubbing liquid from a cleaned gas; and means connected with the cyclone for separately withdrawing the contaminated scrubbing liquid and the cleaned gas therefrom.

BRIEF DESCRIPTION OF THE DRAWING

The above and other objects, features and advantages of the invention will become more readily apparent from the following description, reference being made to the accompanying highly diagrammatic drawing in which.

Specific Description

The gas, which contains impurities, particularly dust, droplets or undesired gaseous components, flows in the direction of the arrow 1 through a pre-scrubbing duct 2, which is preferably provided with two sprayers 3 and 4 spaced apart in the direction of flow. The scrubbing liquor may consist, e.g. of water, which is supplied via lines 5 and 6. Fresh water is added through line 7. The treatment of the gas may also serve to cool and/or chemically change the gas.

The pre-scrubbing duct 2 is followed by an accelerating duct 8, the entrance cross-section of which is in the plane represented by the broken line I and which continuously tapers to its exit cross-section, which is the plane indicated by the broken line II.

Figure 2:
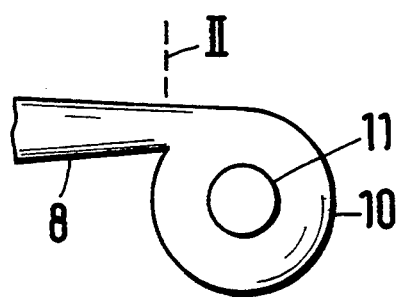
FIG. 2 is a top plan view of the cyclone separator seen in a direction opposite to the direction of the arrow (A) in FIG. 1.

The accelerating duct 8 opens into the cylindrical upper portion of a cyclone separator 10, see also FIG. 2, in which the liquid and gas are separated.

The cleaned gas flows off in the direction of the arrow A through the pure-gas line 11. Liquid which contains impurities is collected in the lower portion of the cyclone 10 and flows through the line 12 into a collecting tank 13. In the accelerating duct 8 the gas and the liquid droplets flow at different velocities to improve the contact between the gas and liquid and to facilitate the separation of the multiphase mixture in the cyclone separator.

A major part of the scrubbing liquor is circulated, as a rule. In order to avoid an excess enriching of solids, the scrubbing liquor can be fed from the collecting tank 13 by the pump 15 through line 14 to a hydrocyclone 16, from which sludge water is withdrawn through line 17. Scrubbing liquor, which has partly been freed from the solids by the hydrocyclone 16, is recycled in line 5 for a renewed use. The line 5 may include an indirect cooler 9, if desired.

The gas which has been sprayed with liquid in the pre-scrubbing duct 2 is then fed into the accelerating duct 8 and in the latter is again sprayed with scrubbing liquor. For that purpose the two sprayers 20 and 21 are provided. They are also spaced apart in the gas flow direction.

Care is taken that the gas is sprayed in the accelerating duct 8 with larger liquid droplets than in the pre-scrubbing duct 2. This is particularly achieved in that the scrubbing liquor is caused to exit from the sprayer 20 and 21 into the accelerating duct 8 at a lower velocity than from the sprayers 3 and 4 into the pre-scrubbing duct 2. As a result, the rate at which liquid is sprayed into the accelerating duct 8 is 0.2 to 0.6 times the rate at which liquid is sprayed into the constant-cross-section pre-scrubbing duct 2.

The inertia of the relatively large liquid droplets in the accelerating duct 8 and the increasing velocity of the gas in the accelerating duct considerably intensify the contact between the gas and liquid and thus improve the gas-purifying or gas-cleaning performance. Besides, fine liquid droplets coming from the pre-scrubbing duct 2 are collected in the accelerating duct 8 by the large liquid droplets so that the separation of the liquid droplets in the cyclone 10 is improved.

The accelerating duct 8 is provided with at least one intermediate outlet 22, from which collected liquid is conducted in line 23 to the collecting tank 13. That withdrawal of liquid results in a considerable decrease of the loading of the cyclone separator 10 with liquid so that the entraining of liquid droplets into the pure-gas line 11 is also decreased. The pre-scrubbing duct 2 may also be provided with at least one intermediate outlet 22a for liquid.

EXAMPLE

The exhaust gas from a metallurgical plant is cleaned by an apparatus which is shown in the drawing. The pre-scrubbing duct 2 has a length of 3 meters and is 0.4 meter in diameter. Scrubbing water is sprayed at two points 3 and 4 disposed at the entrance to the pre-scrubbing duct and in the middle thereof. The pre-scrubbing duct is provided with an intermediate outlet 22a for liquid. The accelerating duct 8 is 3 meters long and its rectangular exit opening into the cyclone 10 has a size of 120×320 mm. The inlet of duct 8 is circular and of a diameter of 0.4 m. The cross section reduction is thus in a ratio of about 3.27:1. Ratios of 4:1 to 2:1 are especially suitable and of 3.5:1 to 3.25:1 are preferred. In the broadest sense the ratio can be 8:1 to 1.5:1 as has been indicated above or even 5:1 to 1.5:1.

The accelerating duct is provided with sprayers at two points 20 and 21 for scrubbing water, namely, at the beginning and in the middle of the accelerating duct. The cyclone 10 has a height of 3 meters and an inside diameter of 0.5 meter.

Exhaust gas at a temperature of 84° C. and at a velocity of flow of 12.3 m/s is fed to the pre-scrubbing duct at a rate of 4340 standard cubic meters ($sm^3$ or $m]S.T.P.$) per hour. The contents of metal dust and NaOH in the raw exhaust gas are stated in column A of the Table in $mg/sm^3$:

TABLE

|  | A<br>Raw gas | B<br>Pure gas | C<br>Scrubbing liquor |
| --- | --- | --- | --- |
| As | 27.93 | 0.11 | 450 |
| Pb | 5.56 | 0.14 | 165 |
| Sb | 2.27 | 0.28 | 35 |
| Sn | 36.05 | 0.03 | 1115 |
| cu | 0.69 | 0.23 | 3 |
| Se | 0.12 | <0.01 | 14 |
| Te | 0.20 | <0.01 | 27 |
| NaOH | 534.5 | 4.2 | 14200 |

Figure 1:
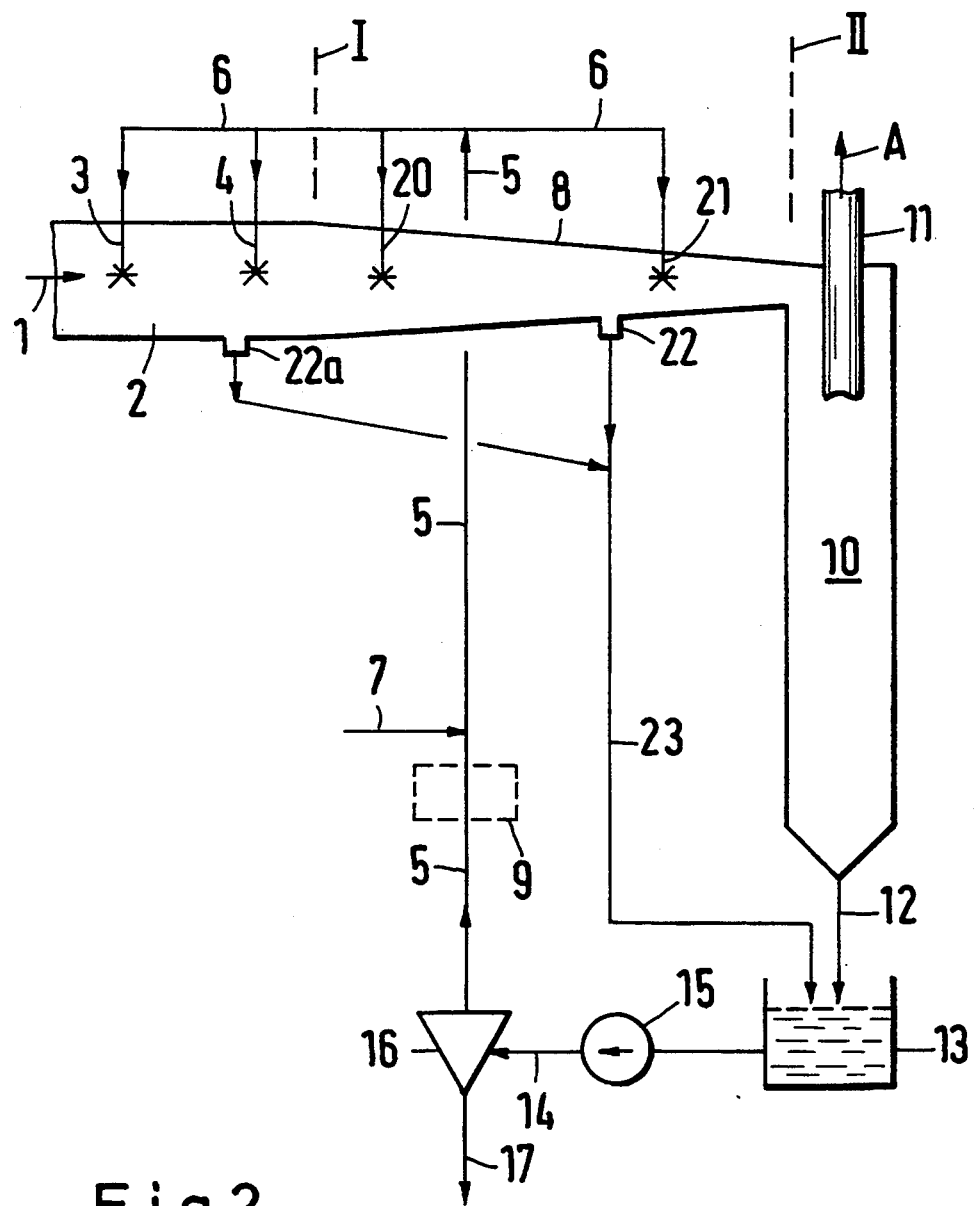
FIG. 1 is a schematic longitudinal sectional view showing the gas-cleaning apparatus.

The spraying stations 3, 4, 20, and 21 are disposed in succession in the direction of flow (see FIG. 1) and have the following data;

|  | 3 | 4 | 20 | 21 |
|---|---|---|---|---|
| Feed pressure of liquid (bars) | 4.0 | 4.0 | 2.5 | 2.0 |
| Volume flow rate of liquid (m³/h) | 14.1 | 4.8 | 3.3 | 3.4 |
| Droplet size range | | | | |
| minimum (mm) | 0.2 | 0.02 | 0.02 | 0.2 |
| maximum (mm) | 1.0 | 0.1 | 0.1 | 1.0 |

Air for atomizing the scrubbing liquor was fed to each of the spraying stations 4 and 20 at a rate of 100 m³/h under a feed pressure of 3 bars. The cooler 9 is not used and the water to be sprayed has a temperature of 77° C. in line 6.

The pure gas is at a temperature of 77° C. as it leaves the cyclone 10 in the duct 11 and contains the residual impurities stated in column B of the Table (in mg/sm³). Under steady-state conditions, the impurities in the water to be sprayed, which is flowing in line 6, are present at the concentrations stated in column C (in mg/liter).

I claim:

1. A process for the wet cleaning of a gas, comprising the steps of:

(a) initially passing said gas through a substantially constant cross section prescrubbing line and spraying said gas with a scrubbing liquid at at least one location along said prescrubbing line;

(b) then passing said gas from said prescrubbing line through a substantially horizontal accelerating line having an entrance flow cross section substantially 1.5 to 8 times larger than an exit flow cross section;

(c) spraying said gas with additional scrubbing liquid in said accelerating line at at least one location therealong, said gas being sprayed in said accelerating line with larger liquid droplets than in said prescrubbing line;

(d) discharging said horizontal accelerating line at said exit flow cross section into a cyclone separator and separating contaminated scrubbing liquid from cleaned gas in said cyclone separator; and (e) separately withdrawing said contaminated scrubbing liquid and cleaned gas from said cyclone separator.

2. The process defined in claim 1 wherein said entrance flow cross section has a ratio to said exit flow cross section in the range of 6:1 to 2:1.

3. The process defined in claim 2 wherein said entrance flow cross section has a ratio to said exit flow cross section in a range up to 5:1.

4. The process defined in claim 1 wherein said gas is passed through at least two spraying stations in each of said prescrubbing and acceleration lines.

5. The process defined in claim 1, further comprising feeding spraying liquid to said accelerating line at a lower rate than to said prescrubbing line.

* * * * *